(12) United States Patent
Chung et al.

(10) Patent No.: US 10,649,283 B2
(45) Date of Patent: May 12, 2020

(54) LIQUID CRYSTAL DISPLAY DEVICE WITH SWITCHABLE VIEWING ANGLE AND VIEWING ANGLE SWITCHING METHOD

(71) Applicant: INFOVISION OPTOELECTRONICS (KUNSHAN) CO., LTD., Kunshan, Jiangsu Province (CN)

(72) Inventors: Techen Chung, Kunshan (CN); Peiyang Lin, Kunshan (CN); Dalei Zhang, Kunshan (CN)

(73) Assignee: INFOVISION OPTOELECTRONICS (KUNSHAN) CO., LTD., Kunshan, Jiangsu Province (CN)

( * ) Notice: Subject to any disclaimer, the term of this patent is extended or adjusted under 35 U.S.C. 154(b) by 0 days.

(21) Appl. No.: 16/333,001

(22) PCT Filed: Sep. 13, 2016

(86) PCT No.: PCT/CN2016/098828
§ 371 (c)(1),
(2) Date: Mar. 13, 2019

(87) PCT Pub. No.: WO2018/049559
PCT Pub. Date: Mar. 22, 2018

(65) Prior Publication Data
US 2019/0278117 A1    Sep. 12, 2019

(51) Int. Cl.
*G02F 1/1343* (2006.01)
*G02F 1/133* (2006.01)
(Continued)

(52) U.S. Cl.
CPC .............. *G02F 1/1343* (2013.01); *G02F 1/13* (2013.01); *G02F 1/13306* (2013.01); *G09G 3/36* (2013.01);
(Continued)

(58) Field of Classification Search
CPC ..................................................... G02F 1/1343
See application file for complete search history.

(56) References Cited

U.S. PATENT DOCUMENTS

2006/0262057 A1* 11/2006 Sumiyoshi ............ G02F 1/1323
345/87
2007/0152930 A1*  7/2007 Jin ........................ G02F 1/1323
345/87

(Continued)

FOREIGN PATENT DOCUMENTS

CN         104932167 A        9/2015
CN         105739195 A        7/2016
(Continued)

*Primary Examiner* — Edmond C Lau
(74) *Attorney, Agent, or Firm* — Cheng-Ju Chiang

(57) ABSTRACT

A liquid crystal display device includes a display panel, a display control module and a voltage output module. The display panel includes a first substrate, a second substrate, and a liquid crystal layer between the first substrate and the second substrate. The first substrate is provided with a viewing angle control electrode. In a wide viewing angle mode, the image refresh frequency of the display panel is the same as the data input frequency of the image data inputted to the display control module, and the voltage output module outputs a direct current voltage to the viewing angle control electrode. In a narrow viewing angle mode, the image refresh frequency of the display panel is twice or four times the data input frequency of the image data inputted to the display control module, and the voltage output module outputs a periodic alternating voltage to the viewing angle control electrode.

18 Claims, 10 Drawing Sheets

(51) Int. Cl.
G09G 3/36 (2006.01)
G02F 1/13 (2006.01)
(52) U.S. Cl.
CPC ..... *G09G 3/3659* (2013.01); *G09G 2320/068* (2013.01)

(56) References Cited

U.S. PATENT DOCUMENTS

2008/0055221 A1* 3/2008 Yabuta ................ G02F 1/13338
345/90
2010/0103148 A1* 4/2010 Okazaki ................ G02F 1/1323
345/204
2018/0059450 A1* 3/2018 Li ........................ G02F 1/1337

FOREIGN PATENT DOCUMENTS

| CN | 105807511 A | 7/2016 |
| CN | 105807512 A | 7/2016 |

* cited by examiner

AA potential of viewing angle control electrode
BB potential of common electrode (DC Vcom)

AA potential of viewing angle control electrode
BB potential of common electrode (DC Vcom)

AA potential of viewing angle control electrode
BB potential of common electrode (DC Vcom)

AA potential of viewing angle control electrode
BB potential of common electrode (DC Vcom)

LIQUID CRYSTAL DISPLAY DEVICE WITH SWITCHABLE VIEWING ANGLE AND VIEWING ANGLE SWITCHING METHOD

CROSS REFERENCE TO RELATED APPLICATIONS

This application is a 35 U.S.C. § 371 National Phase conversion of International (PCT) Patent Application No. PCT/CN2016/098828, filed on Sep. 13, 2016. The contents of the above-identified applications are incorporated herein by reference. The PCT International Patent Application was filed and published in Chinese.

TECHNICAL FIELD

The present application relates to the technical field of liquid crystal display, and more particularly to a liquid crystal display with switchable viewing angle and a viewing angle switching method.

BACKGROUND

Liquid crystal display (LCD) has the advantages of good image quality, small size, light weight, low driving voltage, low power consumption, no radiation and relatively low manufacturing cost, and is dominant in the field of flat panel display.

Nowadays, liquid crystal display devices are gradually developing towards a wide viewing angle, and liquid crystal display devices such as an in-plane switching mode (IPS) or a fringe field switching mode (FFS) can realize wide viewing angle. However, people in today's society are paying more and more attention to protecting their privacy. There are many things that do not like to share with others. In public places, people want to keep their content confidential when they use a mobile phone or browse a computer. Therefore, the display device with a single viewing angle mode has been unable to meet the needs of the user. In addition to the need for a wide viewing angle, the display device is also desirable to be switched or adjusted to a narrow viewing angle mode when privacy protection is required.

In order to switch the wide and narrow viewing angles of the liquid crystal display device, one way is to apply a vertical electric field to the liquid crystal molecules by using the viewing angle control electrode on the color filter substrate, to thereby achieve a narrow viewing angle mode. Referring to FIG. 1 and FIG. 2, the liquid crystal display device includes a first substrate 11, a second substrate 12 and a liquid crystal layer 13 disposed between the first substrate 11 and the second substrate 12. A viewing angle control electrode 111 is provided on the first substrate 11. As shown in FIG. 1, when displaying in a wide viewing angle, the viewing angle control electrode 111 on the first substrate 11 is applied with no voltage, and the potential difference between the viewing angle control electrode 111 and the common electrode (not shown) on the second substrate 12 is zero, so that the liquid crystal display device realizes a wide viewing angle display. As shown in FIG. 2, when a narrow viewing angle display is required, the viewing angle control electrode 111 on the first substrate 11 is applied with a voltage, which causes a large potential difference between the viewing angle control electrode 111 and the common electrode on the second substrate 12, so that the liquid crystal molecules in the liquid crystal layer 13 are tilted due to a vertical electric field (as indicated by the arrows E) while rotating horizontally, and the contrast of the liquid crystal display device is reduced due to light leakage, to finally achieve a narrow viewing angle display.

In normal display of the liquid crystal display device, the gate driver and the source driver are generally driven by a timing controller. Currently, for matured and mass-produced timing controllers, the image refresh frequency of the images displayed at the output end is equal to the data input frequency of the image data inputted from the input end, and the image refresh frequency for the images cannot be regulated. In the viewing angle switching method mentioned above, when a conventional image refresh frequency of 60 Hz is used, the display panel will have the problems of uneven display (i.e., mura), image sticking and flicker, etc.

SUMMARY

The object of the present application is to provide a liquid crystal display device with switchable viewing angle and a viewing angle switching method, which can easily realize the switching between wide and narrow viewing angles on different occasions and solve the problems of uneven display, image sticking and flicker of the display panel.

In an embodiment of the present application, a liquid crystal display device with switchable viewing angle is provided. The liquid crystal display device includes a display panel. The display panel includes a first substrate, a second substrate disposed opposite to the first substrate, and a liquid crystal layer disposed between the first substrate and the second substrate. The first substrate is provided with a viewing angle control electrode. The second substrate is provided with a common electrode and pixel electrodes. The display panel is switchable between a wide viewing angle mode and a narrow viewing angle mode. The liquid crystal display device further includes a display control module and a voltage output module. In the wide viewing angle mode, the image refresh frequency of the display panel is the same as the data input frequency of the image data inputted to the display control module, and the voltage output module outputs a direct current voltage to the viewing angle control electrode. In the narrow viewing angle mode, the image refresh frequency of the display panel is twice or four times the data input frequency of the image data inputted to the display control module, and the voltage output module outputs a periodic alternating voltage to the viewing angle control electrode.

Further, the liquid crystal display device is provided with a viewing angle switching button for the user to issue a viewing angle switching signal to the liquid crystal display device.

Further, in the narrow viewing angle mode, the alternating voltage outputted by the voltage output module to the viewing angle control electrode fluctuates around a direct current common voltage outputted to the common electrode.

Further, in the narrow viewing angle mode, a period of the alternating voltage outputted by the voltage output module to the viewing angle control electrode is equal to a display period of each frame of the display panel.

Further, in the wide viewing angle mode, the data input frequency and the image refresh frequency are both 60 Hz.

Further, in the narrow viewing angle mode, the data input frequency is 60 Hz, and the image refresh frequency is 120 Hz or 240 Hz.

Further, in the narrow viewing angle mode, the polarity of the voltage on the pixel electrode is inverted once every two frames or every four frames.

Further, the liquid crystal display device further includes a memory for temporarily storing the image data of each frame inputted to the display control module.

Further, the liquid crystal molecules in the liquid crystal layer are positive liquid crystal molecules. In the initial state, the positive liquid crystal molecules are in a lying posture and the display panel is in the wide viewing angle mode. When the alternating voltage is outputted to the viewing angle control electrode, the positive liquid crystal molecules are deflected from the lying posture to a tilting posture and the display panel switches from the wide viewing angle mode to the narrow viewing angle mode.

In an embodiment of the present application, a viewing angle switching method for a liquid crystal display device is further provided. The liquid crystal display device includes a display panel. The display panel includes a first substrate, a second substrate disposed opposite to the first substrate, and a liquid crystal layer disposed between the first substrate and the second substrate. The first substrate is provided with a viewing angle control electrode. The second substrate is provided with a common electrode and pixel electrodes. The display panel is switchable between a wide viewing angle mode and a narrow viewing angle mode. The liquid crystal display device further includes a display control module and a voltage output module. The viewing angle switching method includes:

the display control module receiving a viewing angle switching signal issued by the user, and determining whether the display panel switches to the wide viewing angle mode or the narrow viewing angle mode according to the viewing angle switching signal;

when the display panel is switched to the wide viewing angle mode, the display control module controls the image refresh frequency of the display panel to be the same as the data input frequency of the image data inputted to the display control module, and controls the voltage output module to output a direct current voltage to the viewing angle control electrode;

when the display panel is switched to the narrow viewing angle mode, the display control module controls the image refresh frequency of the display panel to be converted to twice or four times the data input frequency of the image data inputted to the display control module, and controls the voltage output module to output a periodic alternating voltage to the viewing angle control electrode.

Further, the liquid crystal display device is provided with a viewing angle switching button, and the viewing angle switching signal is issued by the user to the liquid crystal display device through the viewing angle switching button.

Further, in the narrow viewing angle mode, the alternating voltage outputted by the voltage output module to the viewing angle control electrode fluctuates around the direct current common voltage outputted to the common electrode.

Further, in the narrow viewing angle mode, a period of the alternating voltage outputted by the voltage output module to the viewing angle control electrode is equal to a display period of each frame of the display panel.

Further, in the wide viewing angle mode, the data input frequency and the image refresh frequency are both 60 Hz.

Further, in the narrow viewing angle mode, the data input frequency is 60 Hz, and the image refresh frequency is 120 Hz or 240 Hz.

Further, in the narrow viewing angle mode, the polarity of the voltage on the pixel electrode is inverted once every two frames or every four frames.

Further, the display control module controls the image refresh frequency of the display panel to be converted to twice or four times the data input frequency of the image data inputted to the display control module, specifically including: first temporarily storing the image data of each frame inputted to the display control module by using a memory, and then controlling the display panel to display the inputted image data of each frame by refreshing twice or four times.

Further, the liquid crystal molecules in the liquid crystal layer are positive liquid crystal molecules. In the initial state, the positive liquid crystal molecules are in a lying posture and the display panel is in the wide viewing angle mode. When the alternating voltage is outputted to the viewing angle control electrode, the positive liquid crystal molecules are deflected from the lying posture to a tilting posture and the display panel switches from the wide viewing angle mode to the narrow viewing angle mode.

In the liquid crystal display device with switchable viewing angle and the viewing angle switching method provided by embodiments of the present application, a viewing angle control electrode for controlling the viewing angle is provided on the first substrate. When receiving an instruction from the user for switching to the narrow viewing angle mode, a periodic alternating voltage is applied to the viewing angle control electrode, in order to switch to the narrow viewing angle mode. Meanwhile, the image refresh frequency at the output end is converted to twice or four times the data input frequency at the input end, that is, when the image data of each frame is inputted from the GPU to the display control module, the display panel displays it by refreshing twice or four times, so that the electric field applied to the liquid crystal molecules changes much faster. In this way, the liquid crystal molecules are not easy to polarize when a bias voltage exists between the viewing angle control electrode and the common electrode, which can effectively alleviate the problems such as uneven display, image sticking, flicker, etc. The present application can realize switching between wide viewing angle and narrow viewing angle on different occasions easily, having good operational flexibility and convenience, and providing a multifunctional liquid crystal display device with the advantages of entertainment use and privacy protection.

DETAILED DESCRIPTION OF PREFERRED EMBODIMENTS

In order to make the objects, technical solutions and advantages of the present application much clearer, embodiments of the present application will be further described with reference to the accompanying drawings.

First Embodiment

Figure 3:
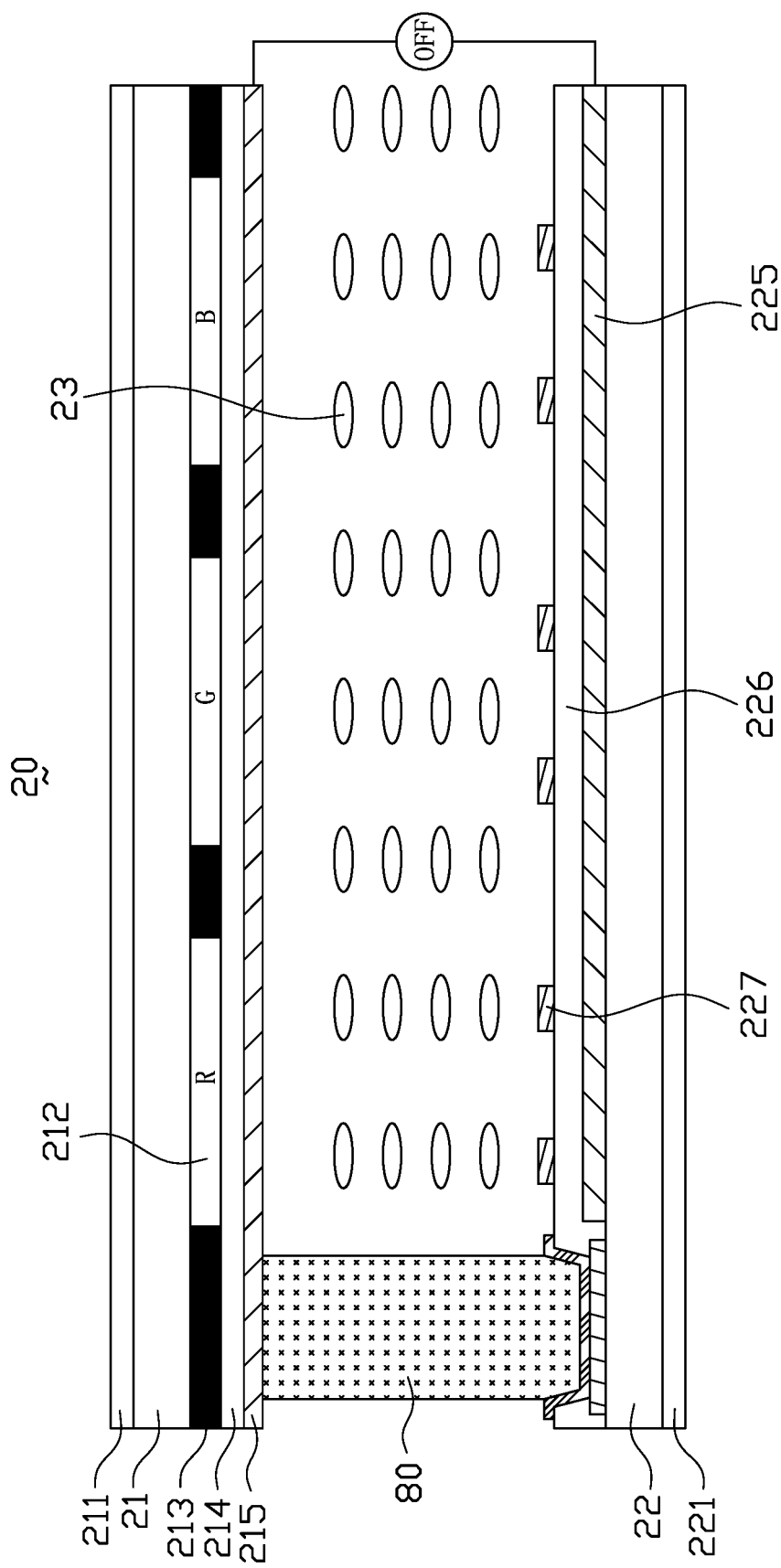
FIG. 3 is a schematic view of a liquid crystal display device in a wide viewing angle mode according to a first embodiment of the present application.
Figure 4:
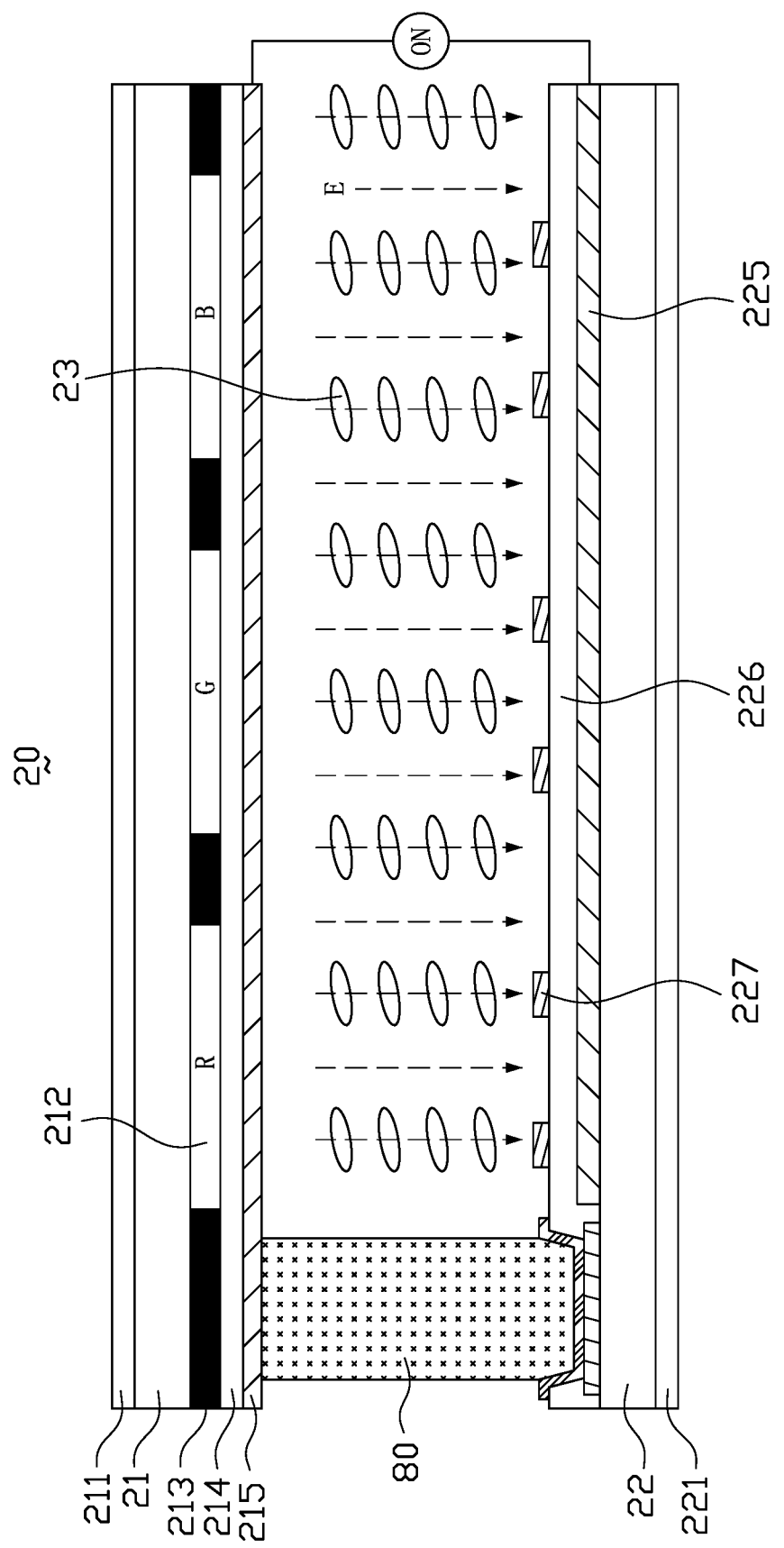
FIG. 4 is a schematic view of the liquid crystal display device of FIG. 3 in a narrow viewing angle mode.

FIG. 3 is a schematic view of a liquid crystal display device in a wide viewing angle mode according to a first embodiment of the present application, and FIG. 4 is a schematic view of the liquid crystal display device of FIG. 3 in a narrow viewing angle mode. Referring to FIG. 3 and FIG. 4, the liquid crystal display device includes a display panel 20. The display panel 20 includes a first substrate 21, a second substrate 22 disposed opposite to the first substrate 21, and a liquid crystal layer 23 disposed between the first substrate 21 and the second substrate 22, wherein the first substrate 21 is a color filter substrate, the second substrate 22 is a TFT array substrate.

In general, when a user views a screen of a liquid crystal display device from different viewing angles, the contrast of the image decreases as the viewing angle increases. In a conventional twisted nematic (TN) type liquid crystal display device, common electrode and pixel electrode are respectively formed on upper and lower substrates, and liquid crystal molecules are rotated in a plane perpendicular to the substrates. However, the viewing angle in the TN type liquid crystal display device is narrow. In order to achieve wide viewing angle, liquid crystal display devices of in-plane switching (IPS) using a horizontal electric field and fringe field switching (FFS) using a fringe electric field have been developed. For the IPS type or FFS type liquid crystal display device, the common electrode and the pixel electrode are formed on the same substrate (i.e., the TFT array substrate), and the liquid crystal molecules are rotated in a plane substantially parallel to the substrates to obtain a wider viewing angle.

The liquid crystal display device in this embodiment is applicable to in-plane switching (IPS) type or fringe field switching (FFS) type liquid crystal display device, and the common electrode and the pixel electrode are formed on the same substrate (i.e., TFT array substrate). When an electric field is applied between the common electrode and the pixel electrode for display, the liquid crystal molecules are rotated in a plane substantially parallel to the substrates to obtain a wide viewing angle. In this embodiment, the liquid crystal display device will be described by taking fringe field switching (FFS) type as an example.

The first substrate 21 is provided with a first polarizer 211 on the surface facing away from the liquid crystal layer 23. The second substrate 22 is provided with a second polarizer 221 on the surface facing away from the liquid crystal layer 23. The light transmission axis of the first polarizer 211 is perpendicular to that of the second polarizer 221.

The first substrate 21 is provided with a color filter layer 212, a black matrix (BM) 213, an overcoat layer 214 and a viewing angle control electrode 215 on the surface facing towards the liquid crystal layer 23. The color filter layer 212 includes, for example, red (R), green (G) and blue (B) color resist materials. The overcoat layer 214 covers the color filter layer 212 and the black matrix 213. The viewing angle control electrode 215 is formed on the overcoat layer 214. It is understood that the structures and arrangements between the respective layers of the first substrate 21 can be appropriately adjusted as required.

Figure 5:
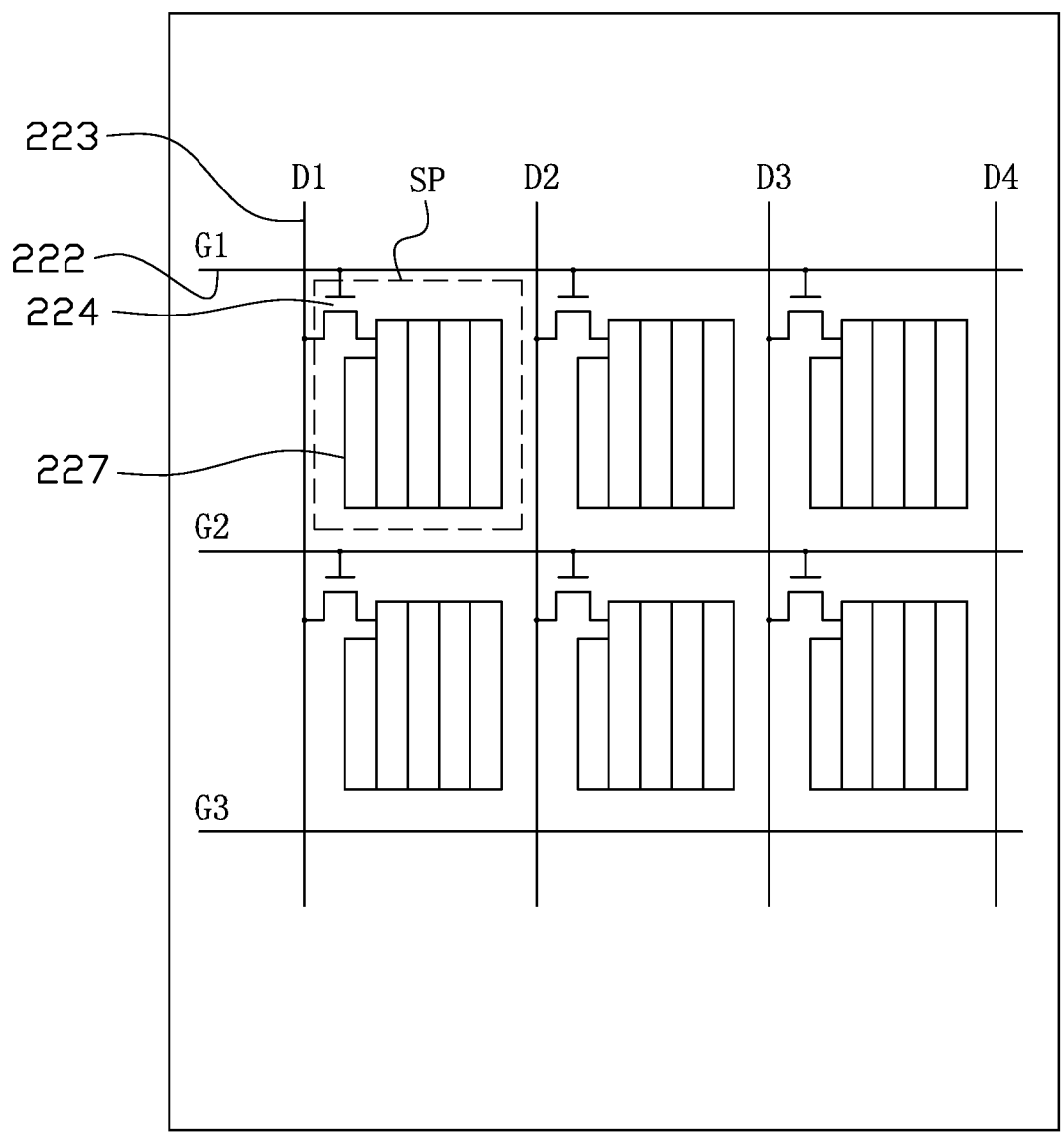
FIG. 5 is a circuit diagram of the second substrate of the liquid crystal display device of FIG. 3.

FIG. 5 is a circuit diagram of the second substrate of the liquid crystal display device of FIG. 3. Referring also to FIG. 5, in this embodiment, the second substrate 22 is provided with scanning lines 222, data lines 223, thin film transistors (TFT) 224, a common electrode 225, an insulating layer 226 and pixel electrodes 227 on the surface facing towards the liquid crystal layer 23. The common electrode 225 and the pixel electrodes 227 are spaced apart and insulted from each other through the insulating layer 226. It is understood that, on the first substrate 21 and the second substrate 22, only the layers related to the present application are shown, while the unrelated layers are omitted.

As shown in FIG. 5, a plurality of the scanning lines 222 and a plurality of the data lines 223 are intersected with each other to define a plurality of sub-pixels SP. The sub-pixels SP are, for example, red, green, and blue sub-pixels. Multiple adjacent sub-pixels SP constitute one pixel for display. For example, each pixel may include three sub-pixels SP of red (R), green (G), and blue (B). In each sub-pixel SP, a pixel electrode 227 and a thin film transistor (TFT) 224 are provided, and the thin film transistor 224 is located near a position where the scanning line 222 and the data line 223 are intersected. The thin film transistor 224 includes a gate electrode, an active layer, a source electrode and a drain electrode (not shown), wherein the gate electrode is electrically connected to the corresponding scanning line 222, the source electrode is electrically connected to the corresponding data line 223, and the drain electrode is electrically connected to the corresponding pixel electrode 227.

In this embodiment, the pixel electrodes 227 are disposed above the common electrode 225, that is, the pixel electrodes 227 are located closer to the liquid crystal layer 23 than the common electrode 225, with the insulating layer 226 disposed between the pixel electrodes 227 and the common electrode 225, but it is not limited thereto. In other embodiments, the pixel electrodes 227 may be disposed below the common electrode 225, that is, the common electrode 225 is located closer to the liquid crystal layer 23 than the pixel electrodes 227. In addition, when the liquid crystal display device adopts in-plane switching (IPS) type, the common electrode 225 and the pixel electrodes 227 may be disposed in the same layer and insulated from each other, and in each sub-pixel SP, the common electrode 225 and the pixel electrode 227 each may be a comb-shaped structure having a plurality of electrode strips mutually inserted with each other.

Referring to FIG. 3 to FIG. 5, the viewing angle control electrode 215, the common electrode 225 and the pixel electrodes 227 may be made of a transparent material such as indium tin oxide (ITO) or indium zinc oxide (IZO). The viewing angle control electrode 215 may be a surface electrode without being patterned, or may be a patterned electrode. The common electrode 225 may be a surface electrode, and the pixel electrode 227 disposed in each sub-pixel SP may be a pattered electrode with electrode strips.

Figure 1:
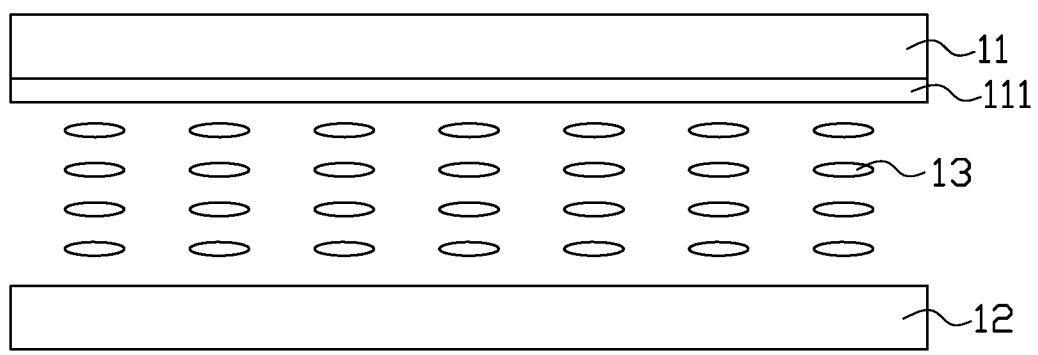
FIG. 1 is a schematic view of a related liquid crystal display device in a wide viewing angle mode.
Figure 2:
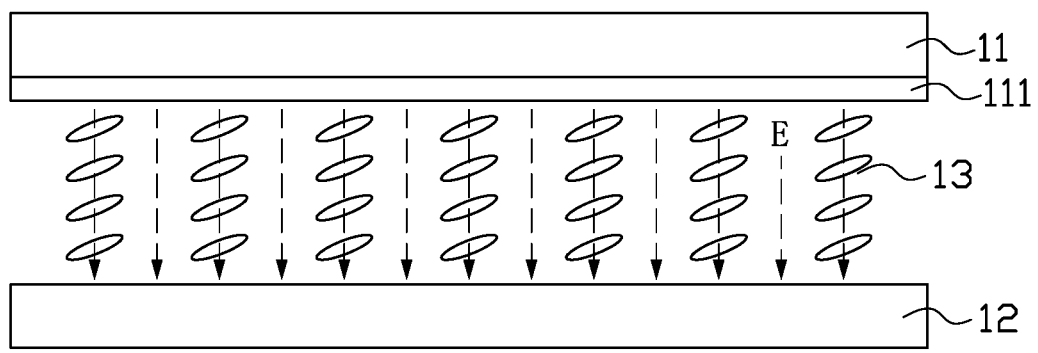
FIG. 2 is a schematic view of the liquid crystal display device of FIG. 1 in a narrow viewing angle mode.

In this embodiment, the liquid crystal molecules in the liquid crystal layer 23 are positive liquid crystal molecules, and the positive liquid crystal molecules have the advantage of fast response. In the initial state (i.e., no voltage is applied to the display panel 20), the positive liquid crystal molecules in the liquid crystal layer 23 assume a lying posture in parallel to the substrates 21, 22, with the long-axis direction of the positive liquid crystal molecules being substantially parallel to the substrates 21, 22 (see FIG. 1). In practical applications, the positive liquid crystal molecules in the liquid crystal layer 23 may have a small initial pretilt angle relative to the substrates 21, 22, and the initial pretilt angle may be in the range from greater than or equal to 0 degrees and less than or equal to 5 degrees, namely, $0° \leq \theta \leq 5°$.

The viewing angle control electrode 215 is used for controlling the switching of the viewing angle of the display panel 20. As shown in FIG. 3 and FIG. 4, by applying a voltage to the viewing angle control electrode 215, a potential difference (i.e., bias voltage) exists between the viewing angle control electrode 215 and the common electrode 225, so that the display panel 20 can switch between a wide viewing angle mode and a narrow viewing angle mode.

Referring to FIG. 3, when no bias voltage or a small bias voltage (e.g., less than 0.5V) is applied between the viewing angle control electrode 215 and the common electrode 225, the tilt angle of the liquid crystal molecules is almost unchanged and remains in the lying posture. The liquid crystal molecules are driven by an in-plane electric field in the conventional way, in which an in-plane electric field is formed between the pixel electrodes 227 and the common electrode 225 provided on the same substrate (i.e., the second substrate 22) to rotate in a plane parallel to the substrates 21, 22, such that the liquid crystal molecules achieve a wide viewing angle mode under the action of a strong in-plane electric field.

Referring to FIG. 4, when a large bias voltage is applied between the viewing angle control electrode 215 and the common electrode 225, a vertical electric field is formed between the two substrates 21, 22 (as indicated by the arrows E). Since the positive liquid crystal molecules will deflect towards a direction parallel to the electric field lines under an electric field, the positive liquid crystal molecules are deflected under the action of the vertical electric field, to increase the tilt angle between the liquid crystal molecules and the substrates 21, 22. Since the liquid crystal molecules are tilted, the light passing through the liquid crystal molecules in the squint direction of the display panel 20 is not matched with the upper and lower polarizers 211, 221 due to phase delay, and a light leakage occurs. When the display panel 20 is viewed from the squint direction, the contrast of the screen is lowered to affect the viewing effect, and the viewing angle is reduced, to thereby achieve a narrow viewing angle mode.

Figure 6A:
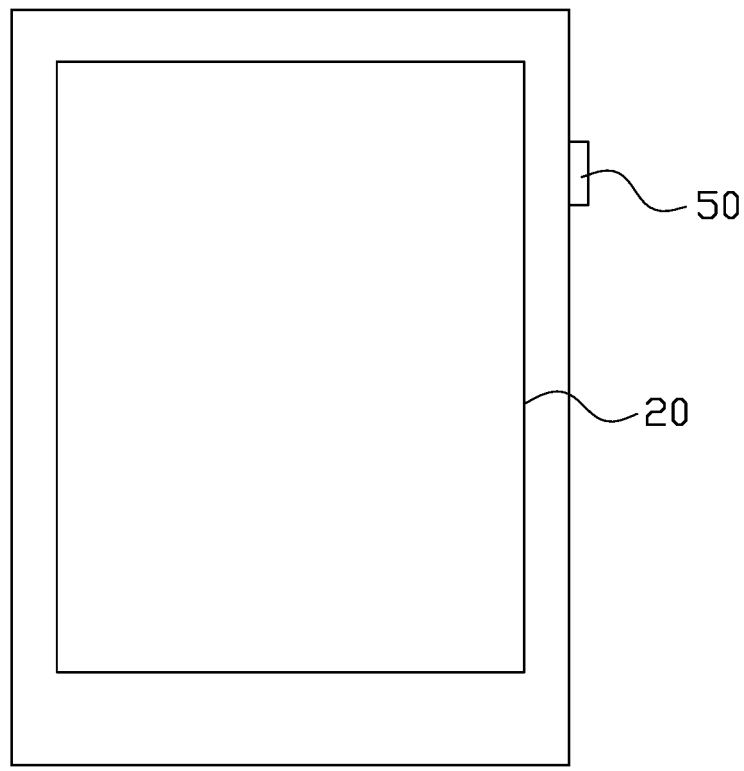
FIG. 6*a* to FIG. 6*b* are planar views of the liquid crystal display device of FIG. 3.
Figure 6B:
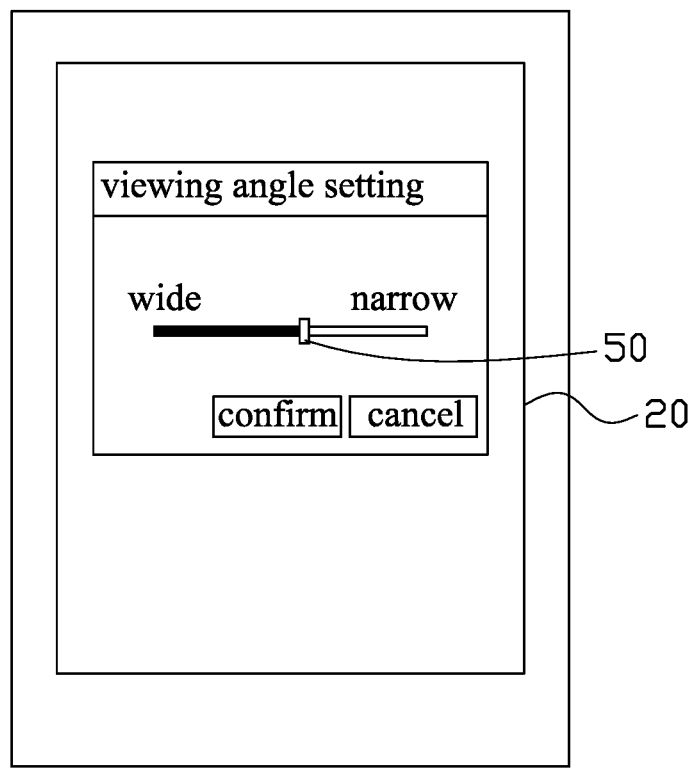

FIG. 6a to FIG. 6b are schematic views of the planar structure of the liquid crystal display device of FIG. 3. Referring to FIG. 6a to FIG. 6b, the liquid crystal display device is provided with a viewing angle switching button 50 for the user to issue a viewing angle switching signal to the liquid crystal display device. The viewing angle switching button 50 may be a physical button (see FIG. 6a), or may be a virtual button by a software control or an application (APP) to implement the switching function (see FIG. 6b, the viewing angle is set by a slider bar). Under normal conditions, no bias voltage or a small bias voltage (e.g., less than 0.5V) is applied between the viewing angle control electrode 215 and the common electrode 225, and the liquid crystal display device is in a wide viewing angle mode. When it is needed to switch to the narrow viewing angle mode for protection of privacy, the user can operate the viewing angle switching button 50 to issue a viewing angle switching signal, so that a bias voltage with a certain value (e.g., 2V-7V) is applied between the viewing angle control electrode 215 and the common electrode 225, to thereby switch to the narrow viewing angle mode. When the narrow viewing angle mode is not required, the user can cancel the bias voltage applied between the viewing angle control electrode 215 and the common electrode 225 by operating the viewing angle switching button 50 again, to thereby return back to the wide viewing angle mode. Therefore, the liquid crystal display device with switchable viewing angle provided by the embodiment of the present application has good operational flexibility and convenience.

Figure 7:
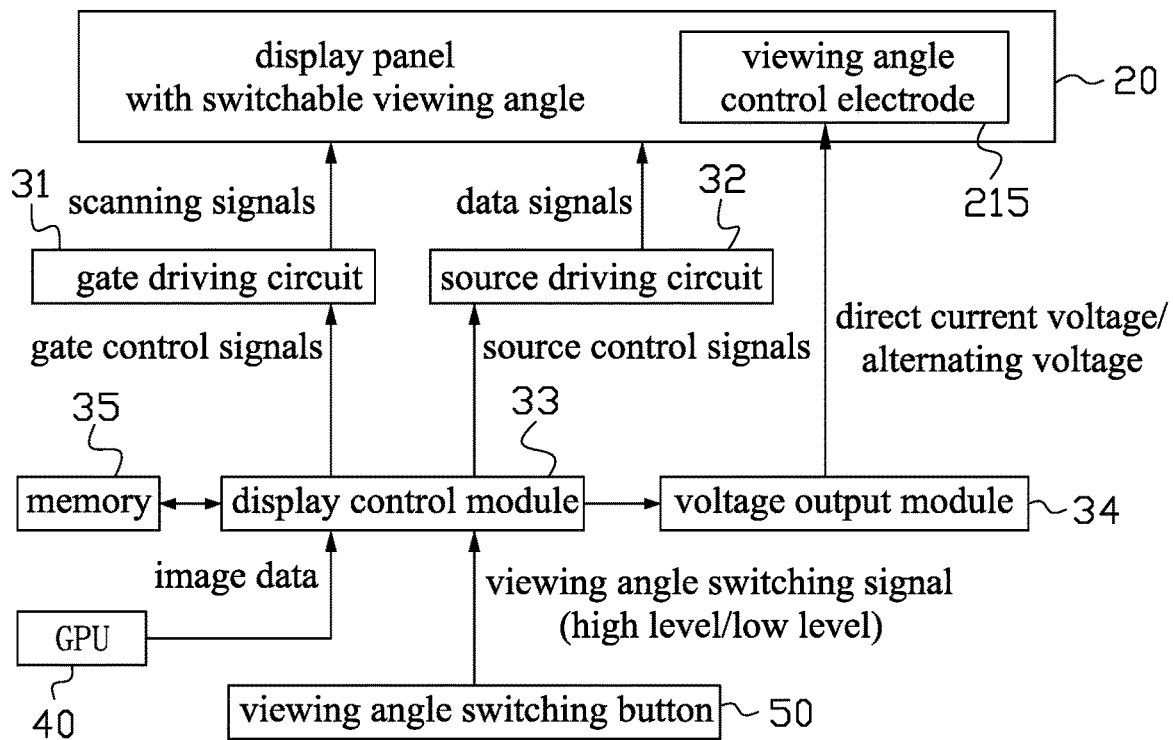
FIG. 7 is a block diagram of the liquid crystal display device of FIG. 3.

FIG. 7 is a block diagram of the liquid crystal display device of FIG. 3. Referring to FIG. 7, the liquid crystal display device further includes a gate driving circuit 31, a source driving circuit 32, a display control module 33 and a voltage output module 34. The gate driving circuit 31 is connected with the respective scanning lines 222, and the source driving circuit 32 is connected with the respective data lines 223. The display control module 33 may specifically be a timing controller (T-CON) or an application specific integrated circuit (ASIC). The display control module 33 is used to control the display panel 20 to achieve image display. Specifically, after receiving and processing the image data from the graphic processing unit (GPU) 40, the display control module 33 generates gate control signals and outputs them to the gate driving circuit 31, and generates source control signals and outputs them to the source driving circuit 32. The gate driving circuit 31 generates scanning signals according to the gate control signals outputted from the display control module 33 to control the thin film transistors 224 connected with the scanning lines 222 to turn on or off. The data driving circuit 32 generates data signals needed to drive the liquid crystal molecules according to the source control signals outputted from the display control module 33, and outputs the data signals to the pixel electrodes 227 through the data lines 223 and the opened thin film transistors 224.

During display of one frame of the display panel 20, the display control module 33 controls the gate driving circuit 31 to sequentially send out scanning signals to the respective scanning lines 222, to turn on the TFTs 224 of each row. When the TFTs 224 of each row are turned on, the display control module 33 controls the source driving circuit 32 to send out data signals to the respective data lines 223 for charging a whole row of sub-pixels SP with required voltages. When all of the scanning lines 222 are scanned and all of the sub-pixels SP are charged, the display of one frame is finished. Currently, the image refresh frequency frequently-used is, for example, 60 Hz (i.e., refreshing 60 frames of image per second during display).

In order to achieve wide and narrow viewing angle switching, the display control module 33 also controls the voltage output module 34 to output a direct current voltage or an alternating voltage to the viewing angle control electrode 215 on the first substrate 21. The voltage output module 34 may specifically be a digital to analog conversion circuit for converting digital signals into analog signal waveforms.

Figure 8:
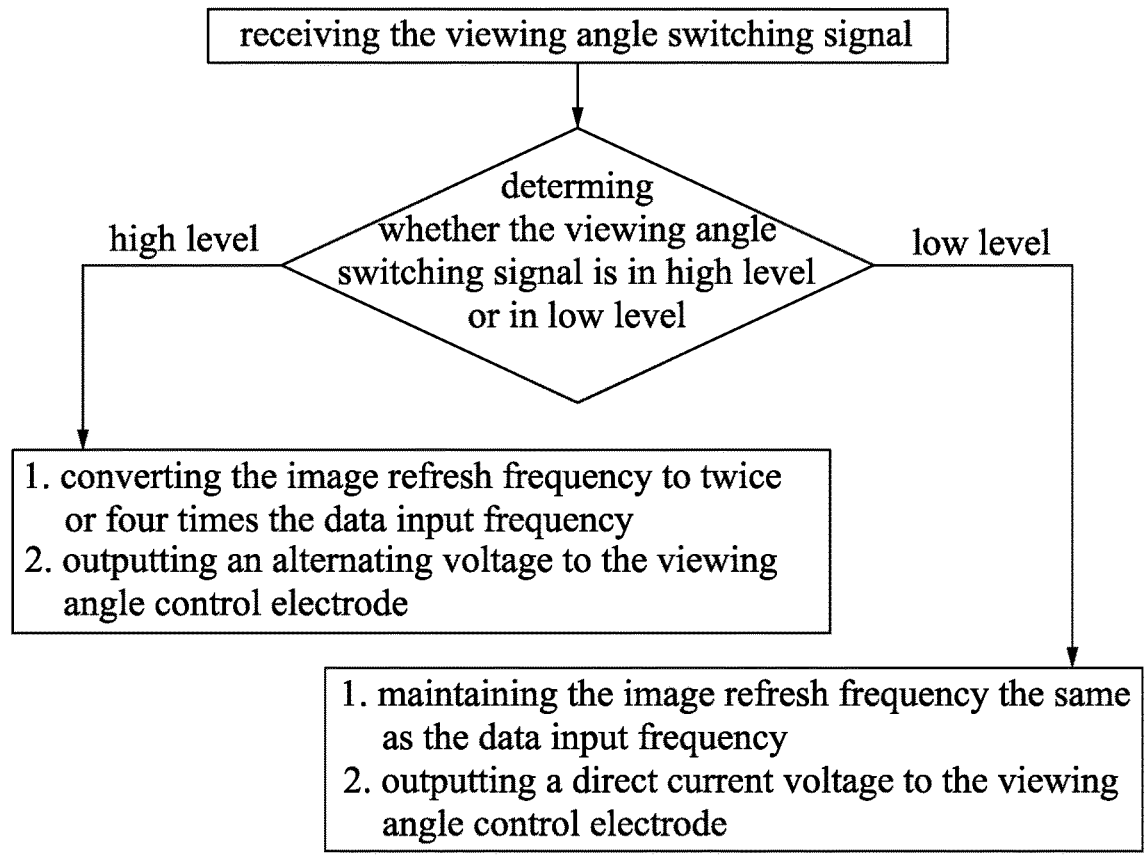
FIG. 8 is a flowchart showing the operation of the liquid crystal display device of FIG. 3 when switching between wide and narrow viewing angles.

FIG. 8 is a flowchart showing the operation of the liquid crystal display device of FIG. 3 when switching between wide and narrow viewing angles. Referring to FIG. 7 and FIG. 8, a viewing angle switching signal is issued from the user to the liquid crystal display device through the viewing angle switching button 50. The display control module 33 receives the viewing angle switching signal, and determines whether the liquid crystal display device operates in a wide viewing angle mode or a narrow viewing angle mode according to the viewing angle switching signal. In this embodiment, it is assumed that when an instruction issued by the viewing angle switching button 50 is to switch to a narrow viewing angle mode, the viewing angle switching signal is correspondingly in a high level; and when an instruction issued by the viewing angle switching button 50 is to switch to a wide viewing angle mode, the viewing angle switching signal is correspondingly in a low level. Therefore, the display control module 33 can determine whether the user issues an instruction for switching the viewing angle according to the change of the viewing angle switching signal between high level and low level.

The display panel 20 is in the wide viewing angle mode by default, and correspondingly, the viewing angle switching signal is in a low level. In the wide viewing angle mode, the image refresh frequency of the display panel 20 is the same as the data input frequency of the image data inputted from the GPU 40 to the display control module 33, that is, when the image data of each frame is inputted from the GPU 40 to the display control module 33, the display panel 20 displays it by refreshing once. For example, if the frequency of the image data inputted from the GPU 40 to the display control module 33 is 60 Hz, when the image data is outputted to the display panel 20 for display, the display control module 33 controls the image refresh frequency of the display panel 20 also at 60 Hz. Further, in the wide viewing angle mode, the voltage output module 34 outputs a direct current voltage to the viewing angle control electrode 215, and no bias voltage or a small bias voltage (e.g., less than 0.5V) exists between the viewing angle control electrode 215 and the common electrode 225. Moreover, the voltage applied to the common electrode 225 is a direct current common voltage (DC Vcom) regardless of it is in the wide viewing angle mode or in the narrow viewing angle mode.

Figure 9:
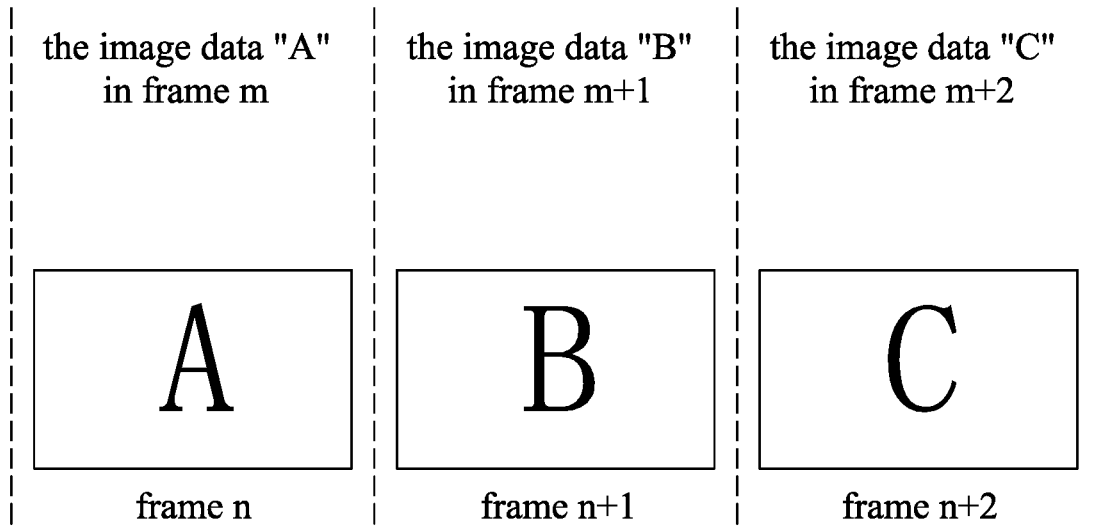
FIG. 9 is a schematic diagram of the relationship between the image refresh frequency and the data input frequency of the liquid crystal display device of FIG. 3 in the wide viewing angle mode.

FIG. 9 is a schematic diagram of the relationship between the image refresh frequency and the data input frequency of the liquid crystal display device of FIG. 3 in the wide viewing angle mode. In the wide viewing angle mode, the image refresh frequency is the same as the data input frequency. When the image data of each frame is inputted from the GPU 40 to the display control module 33, the display control module 33 controls the display panel 20 to display it synchronously. Preferably, in the wide viewing angle mode, the data input frequency at the input end and the image refresh frequency at the output end are both 60 Hz. For example, when the image data of (m)th frame (to display "A" on the screen), the image data of (m+1)th frame (to display "B" on the screen) and the image data of (m+2)th frame (to display "C" on the screen) are respectively inputted from the GPU 40 to the display control module 33, "A", "B" and "C" are displayed on the screen of the display panel 20 in the (n)th frame, the (n+1)th frame and the (n+2)th frame, respectively.

When the display control module 33 receives a high-level viewing angle switching signal, it is determined that the user issues an instruction for switching to the narrow viewing angle mode through the viewing angle switching button 50, and the display control module 33 controls the display panel 20 to switch from the wide viewing angle mode to the narrow viewing angle mode. In the narrow viewing angle mode, the image refresh frequency of the display panel 20 is twice or four times the data input frequency of the image data inputted from the GPU 40 to the display control module 33, that is, when the image data of each frame is inputted from the GPU 40 to the display control module 33, the display panel 20 displays it by refreshing twice or four times. For example, if the frequency of the image data inputted from the GPU 40 to the display control module 33 is 60 Hz, when the image data is outputted to the display panel 20 for display, the display control module 33 controls the image refresh frequency of the display panel 20 to be converted to 120 Hz or 240 Hz. Further, in the narrow viewing angle mode, the voltage output module 34 outputs a periodic alternating voltage for controlling the switching of the viewing angle to the viewing angle control electrode 215, and the alternating voltage applied to the viewing angle control electrode 215 fluctuates around the direct current common voltage (DC Vcom) outputted to the common electrode 225. The display panel 20 is in a narrow viewing angle mode due to the bias voltage existed between the viewing angle control electrode 215 and the common electrode 225.

Figure 10:
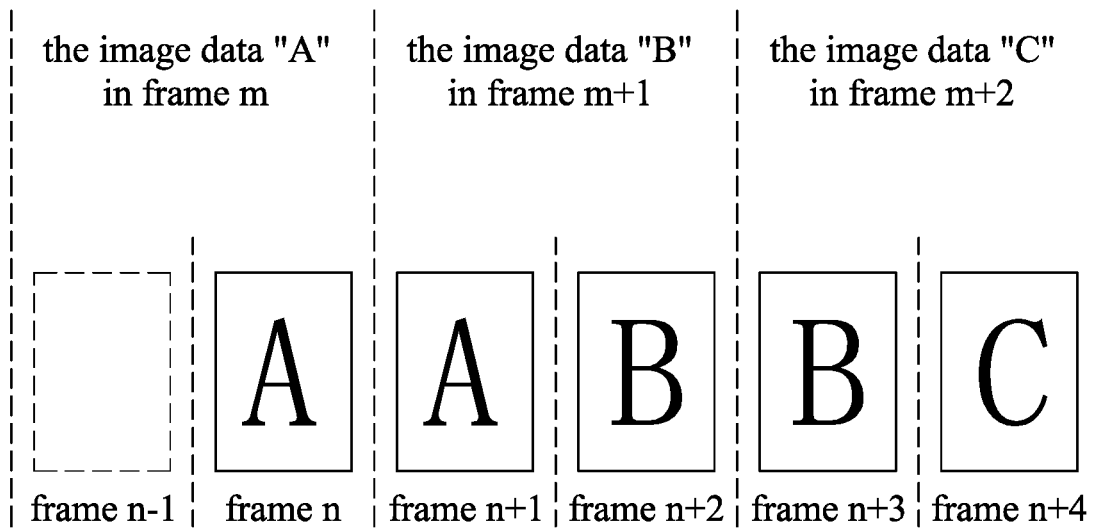
FIG. 10 is a schematic diagram of the relationship between the image refresh frequency and the data input frequency of the liquid crystal display device of FIG. 3 in the narrow viewing angle mode.

FIG. 10 is a schematic diagram of the relationship between the image refresh frequency and the data input frequency of the liquid crystal display device of FIG. 3 in the narrow viewing angle mode. In the narrow viewing angle mode, the image refresh frequency is twice or four times the data input frequency. Preferably, in the narrow viewing angle mode, the data input frequency at the input end is 60 Hz, and the image refresh frequency at the output end is 120 Hz or 240 Hz. In order to achieve the conversion between the data input frequency and the image refresh frequency, the liquid crystal display device further includes a memory 35 (see FIG. 7), the memory 35 is used for temporarily storing the image data of each frame inputted from the GPU 40 to the display control module 33. The voltage output module 34 and the memory 35 may be disposed external to the display control module 33 or disposed inside the display control module 33. The image data of each frame inputted from the GPU 40 to the display control module 33 is temporarily stored in the memory 35 by the display control module 33, and it is then displayed on the screen asynchronously by data copying. Hereinafter, an example in which the image refresh frequency is twice the data input frequency is illustrated. For example, when the image data of (m)th frame (to display "A" on the screen), the image data of (m+1)th frame (to display "B" on the screen) and the image data of (m+2)th frame (to display "C" on the screen) are respectively inputted from the GPU 40 to the display control module 33, "A" is displayed on the screen of the display panel 20 in the (n)th frame and the (n+1)th frame, "B" is displayed on the screen in the (n+2)th frame and the (n+3)th frame, and "C" is displayed on the screen in the (n+4)th frame and the (n+5)th frame. That is, the image data of each frame inputted from the GPU 40 to the display control module 33 is first temporarily stored in the memory 35, and then the inputted image data of each frame is displayed on the display panel 20 by refreshing twice. It is understood that when the image refresh frequency is four times the data input frequency, the inputted image data of each frame will be displayed on the display panel 20 by refreshing four times.

Figure 11:
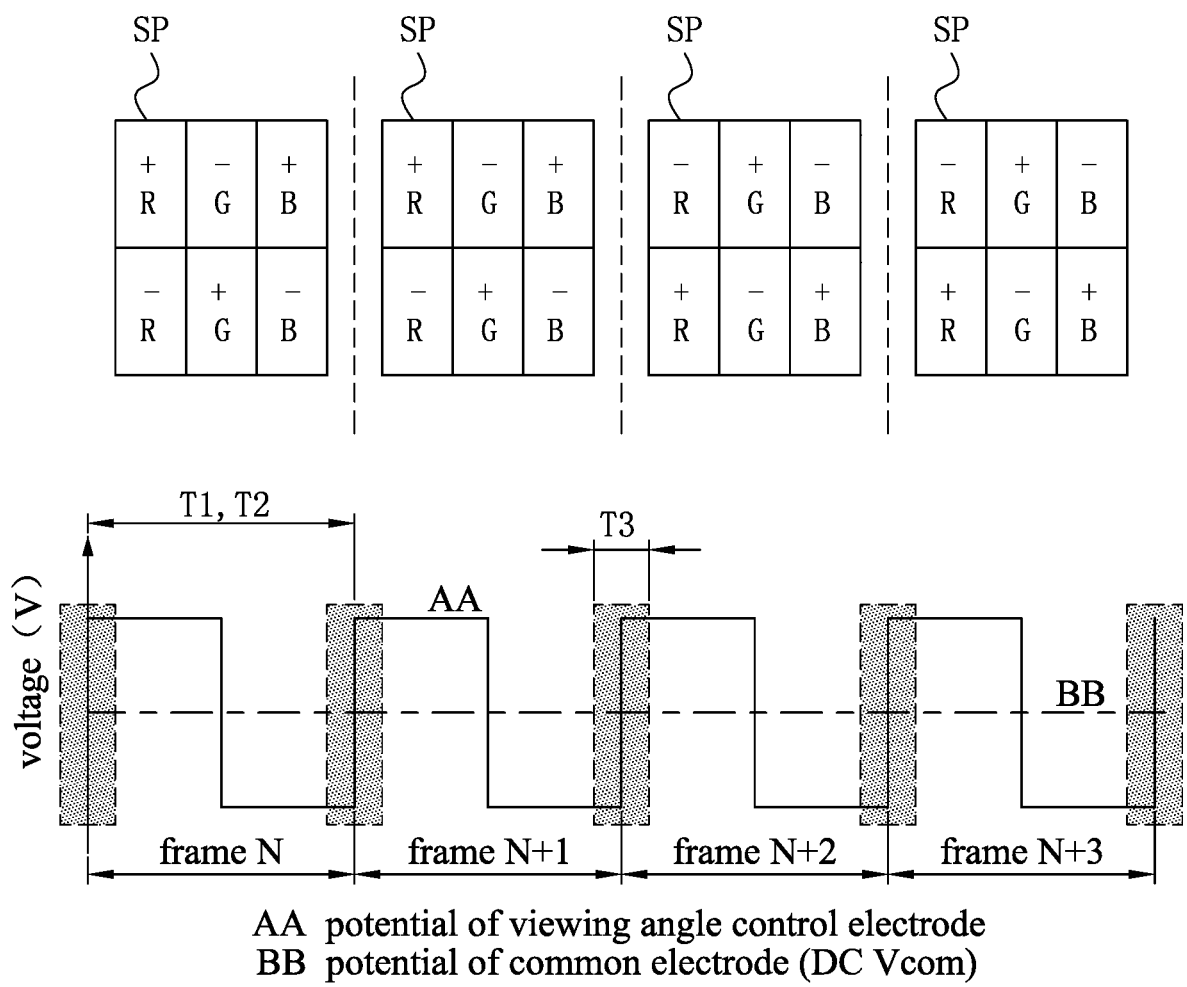
FIG. 11 is a schematic diagram of the waveform of an alternating voltage on the viewing angle control electrode and the polarity of the data signals on the pixel electrodes of the liquid crystal display device of FIG. 3 in the narrow viewing angle mode.
Figure 12A:
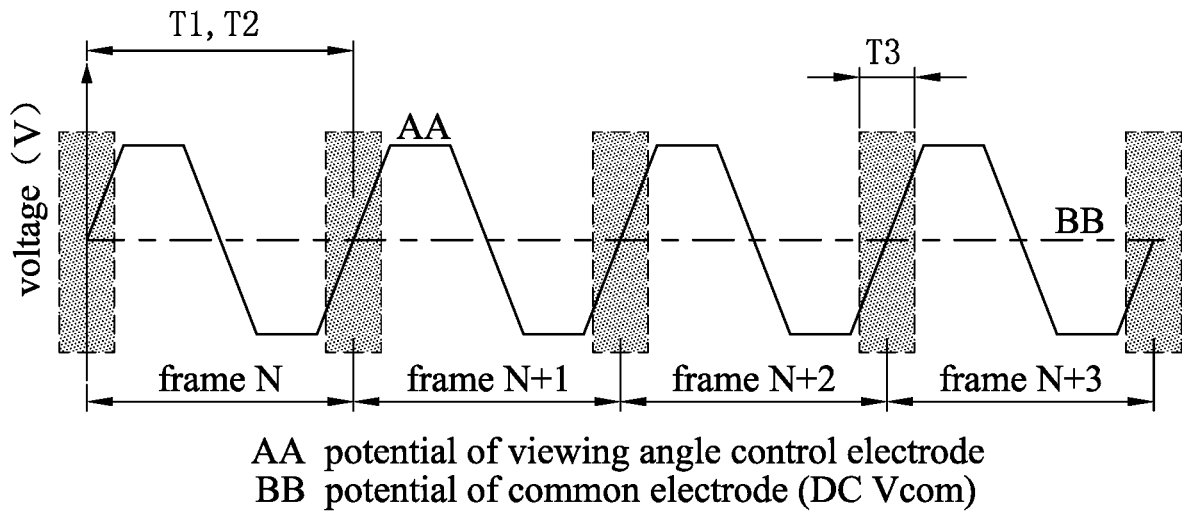
FIG. 12*a* to FIG. 12*d* are schematic diagrams showing the waveforms of the alternating voltage on the viewing angle control electrode in the narrow viewing angle mode according to other examples of the present application.
Figure 12B:
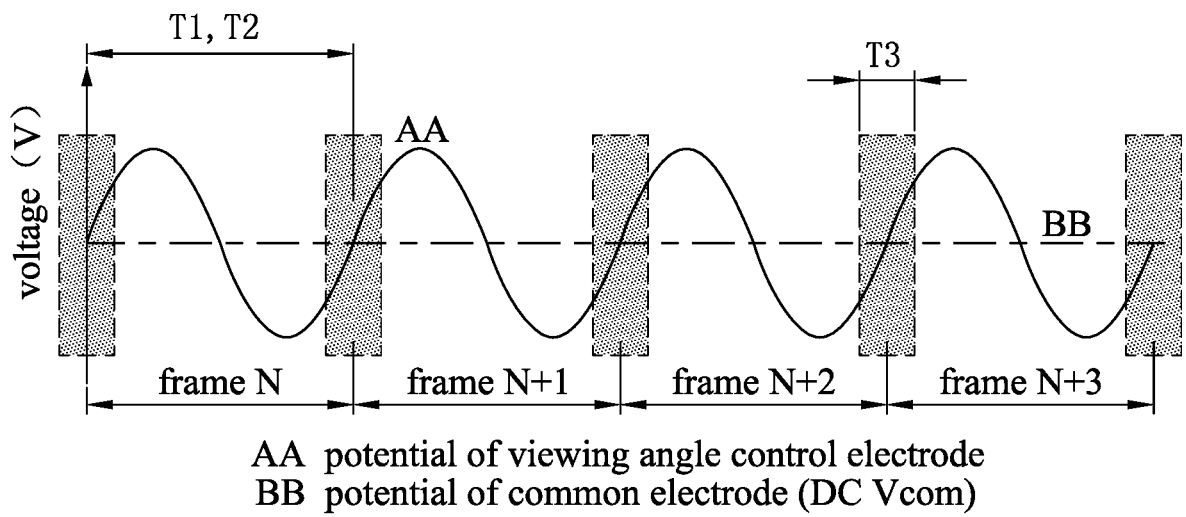
Figure 12C:
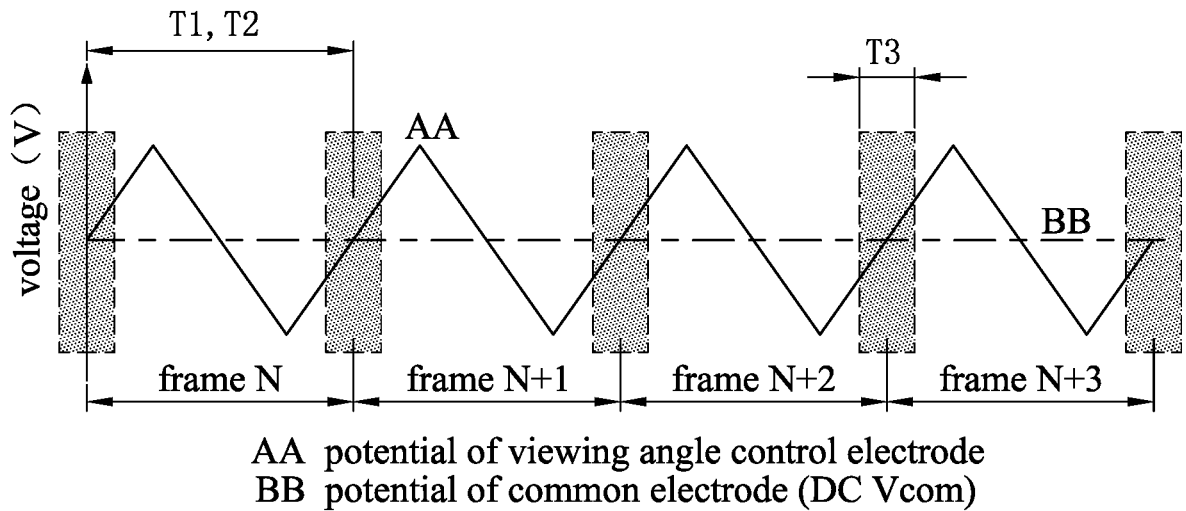
Figure 12D:
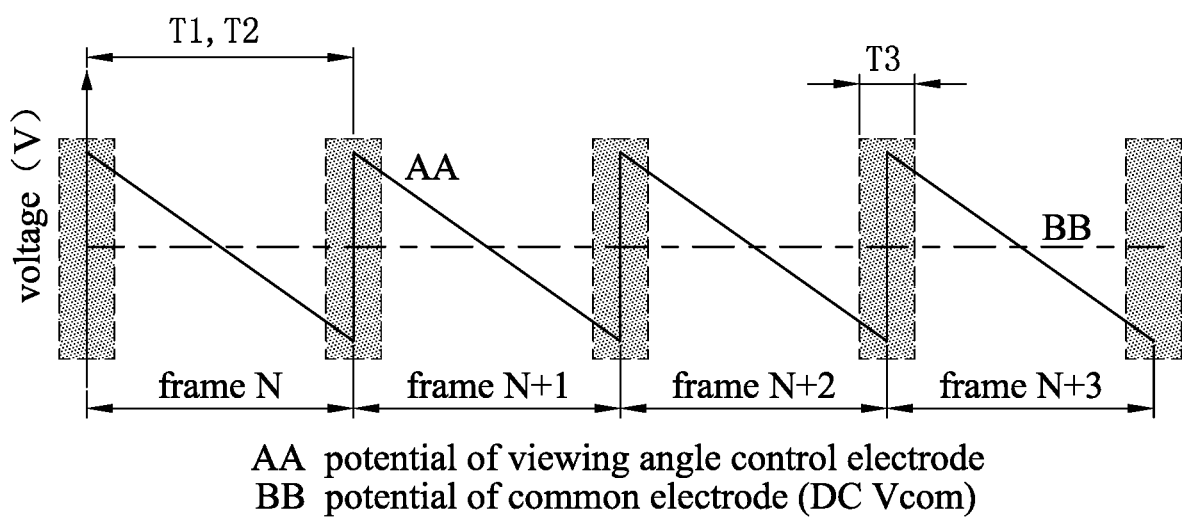

FIG. 11 is a schematic diagram of the waveform of an alternating voltage on the viewing angle control electrode and the polarity of the data signals on the pixel electrodes of the liquid crystal display device of FIG. 3 in the narrow viewing angle mode. In the narrow viewing angle mode, the voltage output module 34 outputs a periodic alternating voltage to the viewing angle control electrode 215, such that the liquid crystal display device is switched from the wide viewing angle mode to the narrow viewing angle mode. The waveform of the alternating voltage may be a square wave, a trapezoidal wave, a sine wave, a triangular wave, a saw-tooth wave, or the like. A square wave is illustrated in the figure. Moreover, the alternating voltage applied to the viewing angle control electrode 215 fluctuates around the direct current common voltage (DC Vcom) outputted to the common electrode 225. The voltage output module 34 can arbitrarily adjust the amplitude and the frequency of the alternating voltage outputted to the viewing angle control electrode 215, and the output of the voltage output module 34 can be easily synchronized with the signals of the display control module 33, so that when the image refresh frequency changes, the voltage output module 34 can instantly adjust the waveform, the amplitude, or the frequency of the voltage outputted to the viewing angle control electrode 215. As shown in FIG. 11, the display period of each frame is T1, and the period of the periodic alternating voltage applied to the viewing angle control electrode 215 is T2, wherein T2 is equal to T1, that is, the polarity of the alternating voltage applied to the viewing angle control electrode 215 is inverted once in each frame.

During normal display of a display panel, in order to avoid polarization of the liquid crystal molecules, the voltage applied to the pixel electrode is inverted alternately with respect to the common electrode, that is, the voltage of the pixel electrode changes between positive polarity and negative polarity, which is called inversion driving. When the voltage of the pixel electrode is higher than the voltage of the common electrode, it is called positive polarity (+), and when the voltage of the pixel electrode is lower than the voltage of the common electrode, it is called negative polarity (−). In this embodiment, since in the narrow viewing angle mode, the data input frequency at the input end is converted by a multiple (two or four times) to the image refresh frequency at the output end, power consumption will increase. In order to reduce the power consumption, in this embodiment, the voltage polarity inversion manner on the pixel electrode is changed. Conventionally, the polarity of the voltage on the pixel electrode is inverted once per frame. In this embodiment, however, in the narrow viewing angle mode, when the data input frequency at the input end is 60 Hz and the image refresh frequency at the output end is 120 Hz, the polarity of the voltage on the pixel electrode 227 is inverted once every two frames (as shown in FIG. 11). Inversion driving can use frame inversion, row inversion, column inversion, and dot inversion. The dot inversion is illustrated in the figure. Moreover, in the narrow viewing angle mode, when the data input frequency at the input end is 60 Hz and the image refresh frequency at the output end is 240 Hz, the polarity of the voltage on the pixel electrode 227 may be inverted once every four frames or every two frames.

FIG. 12a to FIG. 12d are schematic diagrams showing waveforms of the alternating voltage on the viewing angle control electrode in the narrow viewing angle mode according to other examples of the present application. Referring to FIG. 12a to FIG. 12d, the waveform of the periodic alternating voltage applied to the viewing angle control electrode 215 may be a trapezoidal wave (see FIG. 12a), a sine wave (see FIG. 12b), a triangular wave (see FIG. 12c), or a saw-tooth (see FIG. 12d).

In addition, a blanking time T3 may be arranged between two adjacent frames, and the blanking time T3 is a transition time period between adjacent frames. The alternating voltage and its waveform applied to the viewing angle control electrode 215 during the blanking time T3 is not limited.

As shown in FIG. 3, in order to apply a voltage to the viewing angle control electrode 215 of the first substrate 21, the viewing angle control electrode 215 can be electrically conducted from the first substrate 21 to the second substrate 22 through a conductive paste 80 in the peripheral non-display region. The voltage is supplied from voltage output module 34 to the second substrate 22, and then is applied to the viewing angle control electrode 215 of the first substrate 21 from the second substrate 22 through the conductive paste 80.

In the related art, the display panel adopts an image refresh frequency of 60 Hz regardless of the wide viewing angle mode or the narrow viewing angle mode. In the narrow viewing angle mode, since a large bias voltage exists between the viewing angle control electrode and the common electrode, the vertical electric field applied to the liquid crystal molecules is large, which may cause the liquid crystal molecules to be polarized. Further, a periodic alternating voltage is applied to the viewing angle control electrode. Since the viewing angle control electrode is generally made of ITO, the resistance thereof is large, which may result in different electric fields at different segments of the display panel from top to bottom, and the extent of polarization of the liquid crystal molecules is also different. When the pixel electrode is reversed in polarity, the twist angle of the liquid crystal molecules under positive polarity and negative polarity is different. As a result, the display panel is divided into several horizontal segments during display, and the brightness of each segment is slightly different, thereby leading to problems such as uneven display (mura), image sticking, flicker, etc. In this embodiment, when the display panel switches from the wide viewing angle mode to the narrow viewing angle mode, the image refresh frequency at the output end is converted to twice or four times the data input frequency at the input end. For the image data of each frame inputted from the GPU to the display control module, it is displayed on the display panel by refreshing twice or four times, so that the electric field applied to the liquid crystal molecules changes much faster. In this way, the liquid crystal molecules are not easy to polarize when a bias voltage exists between the viewing angle control electrode and the common electrode, which can effectively alleviate the problems such as uneven display, image sticking, flicker, etc.

Second Embodiment

The second embodiment of the present application further provides a viewing angle switching method for a liquid crystal display device, for controlling the switching of the viewing angle on the above-described liquid crystal display device with switchable viewing angle, and the viewing angle switching method includes:

the display control module 33 receives a viewing angle switching signal issued by a user, and determines whether the display panel 20 switches to a wide viewing angle mode or a narrow viewing angle mode according to the viewing angle switching signal;

when the display panel 20 is switched to the wide viewing angle mode, the display control module 33 controls the image refresh frequency of the display panel 20 to be the same as the data input frequency of the image data inputted to the display control module 33, and controls the voltage output module 34 to output a direct current voltage to the viewing angle control electrode 215;

when the display panel 20 is switched to the narrow viewing angle mode, the display control module 33 controls the image refresh frequency of the display panel 20 to be converted to twice or four times the data input frequency of the image data inputted to the display control module 33, and controls the voltage output module 34 to output a periodic alternating voltage to the viewing angle control electrode 215.

Specifically, the liquid crystal display device is provided with a viewing angle switching button 50, and the viewing angle switching signal is issued from the user to the liquid crystal display device through the viewing angle switching button 50.

Specifically, in the narrow viewing angle mode, a direct current common voltage is outputted to the common electrode 225, and an alternating voltage outputted by the voltage output module 34 to the viewing angle control electrode 215 fluctuates around the direct current common voltage.

Specifically, in the narrow viewing angle mode, a period T2 of the alternating voltage outputted by the voltage output module 34 to the viewing angle control electrode 215 is equal to a display period T1 of each frame of the display panel 20.

Specifically, in the wide viewing angle mode, the data input frequency and the image refresh frequency are both 60 Hz.

Specifically, in the narrow viewing angle mode, the data input frequency is 60 Hz, and the image refresh frequency is 120 Hz or 240 Hz.

Specifically, in the narrow viewing angle mode, the polarity of the voltage on the pixel electrode 227 is inverted once every two frames or every four frames.

Specifically, the display control module 33 controls the image refresh frequency of the display panel 20 to be converted to twice or four times the data input frequency of the image data inputted to the display control module 33, specifically including: first temporarily storing the image data of each frame inputted to the display control module 33 by using a memory 35, and then controlling the display panel 20 to display the inputted image data of each frame by refreshing twice or four times.

Specifically, the liquid crystal molecules in the liquid crystal layer 23 are positive liquid crystal molecules. In the initial state, the positive liquid crystal molecules are in a lying posture and the display panel 20 is in a wide viewing angle mode; when an alternating voltage is outputted to the viewing angle control electrode 215, the positive liquid crystal molecules are deflected from the lying posture to a tilting posture and the display panel 20 is switched from the wide viewing angle mode to the narrow viewing angle mode.

The viewing angle switching method of this embodiment has the same concept as the liquid crystal display device in the above embodiment. For more details about the viewing angle switching method, reference may be made to the descriptions relating to the liquid crystal display device, and details are omitted herein for clarity.

In the liquid crystal display device with switchable viewing angle and the viewing angle switching method provided by embodiments of the present application, a viewing angle control electrode for controlling the viewing angle is provided on the first substrate. When receiving an instruction from the user for switching to the narrow viewing angle mode, a periodic alternating voltage is applied to the viewing angle control electrode, in order to switch to the narrow viewing angle mode. Meanwhile, the image refresh frequency at the output end is converted to twice or four times the data input frequency at the input end, that is, when the image data of each frame is inputted from the GPU to the display control module, the display panel displays it by refreshing twice or four times, so that the electric field applied to the liquid crystal molecules changes much faster. In this way, the liquid crystal molecules are not easy to polarize when a bias voltage exists between the viewing angle control electrode and the common electrode, which can effectively alleviate the problems such as uneven display, image sticking, flicker, etc. The present application can realize switching between wide viewing angle and narrow viewing angle on different occasions easily, having good operational flexibility and convenience, and providing a multifunctional liquid crystal display device with the advantages of entertainment use and privacy protection.

The above are only the preferred embodiments of the present application, and are not intended to limit the present application. Any modifications, equivalents, improvements, etc., which are within the spirit and scope of the present application, should be included in the scope of the present application.

INDUSTRIAL APPLICABILITY

In the embodiments of the present application, by providing a viewing angle control electrode for controlling the viewing angle on the first substrate, when receiving an instruction from the user for switching to the narrow viewing angle mode, a periodic alternating voltage is applied to the viewing angle control electrode, in order to switch to the narrow viewing angle mode. Meanwhile, the image refresh frequency at the output end is converted to twice or four times the data input frequency at the input end, that is, when the image data of each frame is inputted from the GPU to the display control module, the display panel displays it by refreshing twice or four times, so that the electric field applied to the liquid crystal molecules changes much faster. In this way, the liquid crystal molecules are not easy to polarize when a bias voltage exists between the viewing angle control electrode and the common electrode, which can effectively alleviate the problems such as uneven display, image sticking, flicker, etc. The present application can realize switching between wide viewing angle and narrow viewing angle on different occasions easily, having good operational flexibility and convenience, and providing a multifunctional liquid crystal display device with the advantages of entertainment use and privacy protection.

What is claimed is:

1. A liquid crystal display device with switchable viewing angle comprising a display panel, the display panel comprising a first substrate, a second substrate disposed opposite to the first substrate, and a liquid crystal layer disposed between the first substrate and the second substrate, the first substrate being provided with a viewing angle control electrode, the second substrate being provided with a common electrode and pixel electrodes, the display panel being switchable between a wide viewing angle mode and a narrow viewing angle mode, wherein the liquid crystal display device further comprises a display control module and a voltage output module; in the wide viewing angle mode, the image refresh frequency of the display panel is the same as the data input frequency of the image data inputted to the display control module, and the voltage output module outputs a direct current voltage to the viewing angle control electrode; in the narrow viewing angle mode, the image refresh frequency of the display panel is twice or four times the data input frequency of the image data inputted to the display control module, and the voltage output module outputs a periodic alternating voltage to the viewing angle control electrode.

2. The liquid crystal display device with switchable viewing angle of claim 1, wherein the liquid crystal display device is provided with a viewing angle switching button for the user to issue a viewing angle switching signal to the liquid crystal display device.

3. The liquid crystal display device with switchable viewing angle of claim 1, wherein in the narrow viewing angle mode, the alternating voltage outputted by the voltage output module to the viewing angle control electrode fluctuates around a direct current common voltage outputted to the common electrode.

4. The liquid crystal display device with switchable viewing angle of claim 1, wherein in the narrow viewing angle mode, a period of the alternating voltage outputted by the voltage output module to the viewing angle control electrode is equal to a display period of each frame of the display panel.

5. The liquid crystal display device with switchable viewing angle of claim 1, wherein in the wide viewing angle mode, the data input frequency and the image refresh frequency are both 60 Hz.

6. The liquid crystal display device with switchable viewing angle of claim 1, wherein in the narrow viewing angle mode, the data input frequency is 60 Hz, and the image refresh frequency is 120 Hz or 240 Hz.

7. The liquid crystal display device with switchable viewing angle of claim 1, wherein in the narrow viewing angle mode, the polarity of the voltage on the pixel electrode is inverted once every two frames or every four frames.

8. The liquid crystal display device with switchable viewing angle of claim 1, wherein the liquid crystal display device further comprises a memory for temporarily storing the image data of each frame inputted to the display control module.

9. The liquid crystal display device with switchable viewing angle of claim 1, wherein the liquid crystal molecules in the liquid crystal layer are positive liquid crystal molecules, and in the initial state, the positive liquid crystal molecules are in a lying posture and the display panel is in the wide viewing angle mode; when the alternating voltage is outputted to the viewing angle control electrode, the positive liquid crystal molecules are deflected from the lying posture to a tilting posture and the display panel switches from the wide viewing angle mode to the narrow viewing angle mode.

10. A viewing angle switching method for a liquid crystal display device, the liquid crystal display device comprising a display panel, the display panel comprising a first substrate, a second substrate disposed opposite to the first substrate, and a liquid crystal layer disposed between the first substrate and the second substrate, the first substrate being provided with a viewing angle control electrode, the second substrate being provided with a common electrode and pixel electrodes, the display panel being switchable between a wide viewing angle mode and a narrow viewing angle mode, wherein the liquid crystal display device further comprises a display control module and a voltage output module, the viewing angle switching method comprises:

the display control module receiving a viewing angle switching signal issued by the user, and determining whether the display panel switches to the wide viewing angle mode or the narrow viewing angle mode according to the viewing angle switching signal;

when the display panel is switched to the wide viewing angle mode, the display control module controls the image refresh frequency of the display panel to be the same as the data input frequency of the image data inputted to the display control module, and controls the voltage output module to output a direct current voltage to the viewing angle control electrode;

when the display panel is switched to the narrow viewing angle mode, the display control module controls the image refresh frequency of the display panel to be converted to twice or four times the data input frequency of the image data inputted to the display control module, and controls the voltage output module to output a periodic alternating voltage to the viewing angle control electrode.

11. The viewing angle switching method for the liquid crystal display device of claim 10, wherein the liquid crystal display device is provided with a viewing angle switching button, and the viewing angle switching signal is issued by the user to the liquid crystal display device through the viewing angle switching button.

12. The viewing angle switching method for the liquid crystal display device of claim 10, wherein in the narrow viewing angle mode, the alternating voltage outputted by the voltage output module to the viewing angle control electrode fluctuates around the direct current common voltage outputted to the common electrode.

13. The viewing angle switching method for the liquid crystal display device of claim 10, wherein in the narrow viewing angle mode, a period of the alternating voltage outputted by the voltage output module to the viewing angle control electrode is equal to a display period of each frame of the display panel.

14. The viewing angle switching method for the liquid crystal display device of claim 10, wherein in the wide viewing angle mode, the data input frequency and the image refresh frequency are both 60 Hz.

15. The viewing angle switching method for the liquid crystal display device of claim 10, wherein in the narrow viewing angle mode, the data input frequency is 60 Hz, and the image refresh frequency is 120 Hz or 240 Hz.

16. The viewing angle switching method for the liquid crystal display device of claim 10, wherein in the narrow viewing angle mode, the polarity of the voltage on the pixel electrode is inverted once every two frames or every four frames.

17. The viewing angle switching method for the liquid crystal display device of claim 10, wherein the display control module controls the image refresh frequency of the display panel to be converted to twice or four times the data input frequency of the image data inputted to the display control module, specifically comprising: first temporarily storing the image data of each frame inputted to the display control module by using a memory, and then controlling the display panel to display the inputted image data of each frame by refreshing twice or four times.

18. The viewing angle switching method for the liquid crystal display device of claim 10, wherein the liquid crystal molecules in the liquid crystal layer are positive liquid crystal molecules, and in the initial state, the positive liquid crystal molecules are in a lying posture and the display panel is in the wide viewing angle mode; when the alternating voltage is outputted to the viewing angle control electrode, the positive liquid crystal molecules are deflected from the lying posture to a tilting posture and the display panel switches from the wide viewing angle mode to the narrow viewing angle mode.

* * * * *